BEST AVAILABLE COPY
G. M. Morgan.
Sheet 1, 2 Sheets
Stone Dressing Mach.
No. 4,263. Fig. 1. Reissued Feb. 14, 1871.
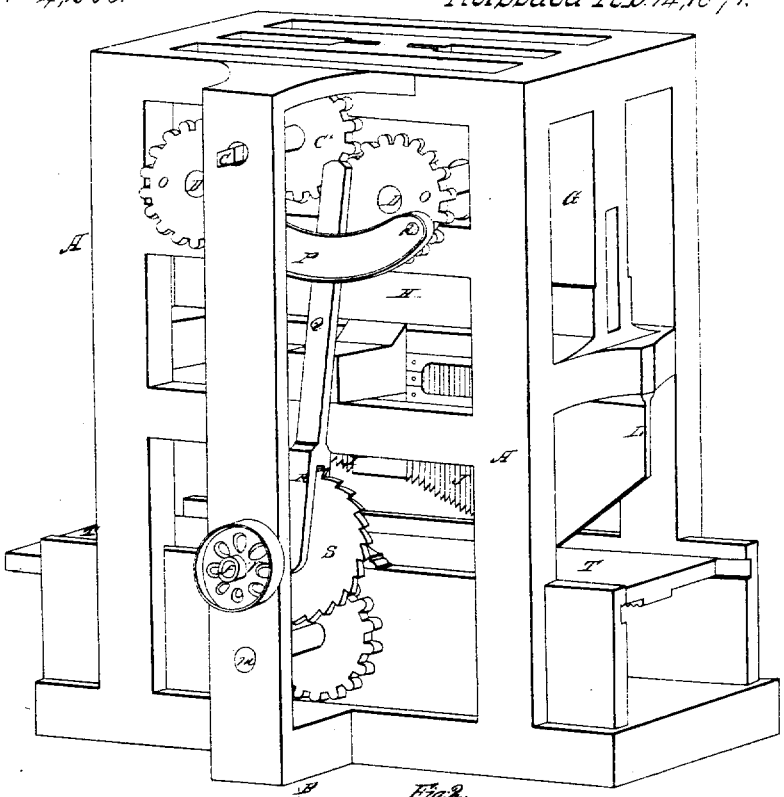
Fig. 2.
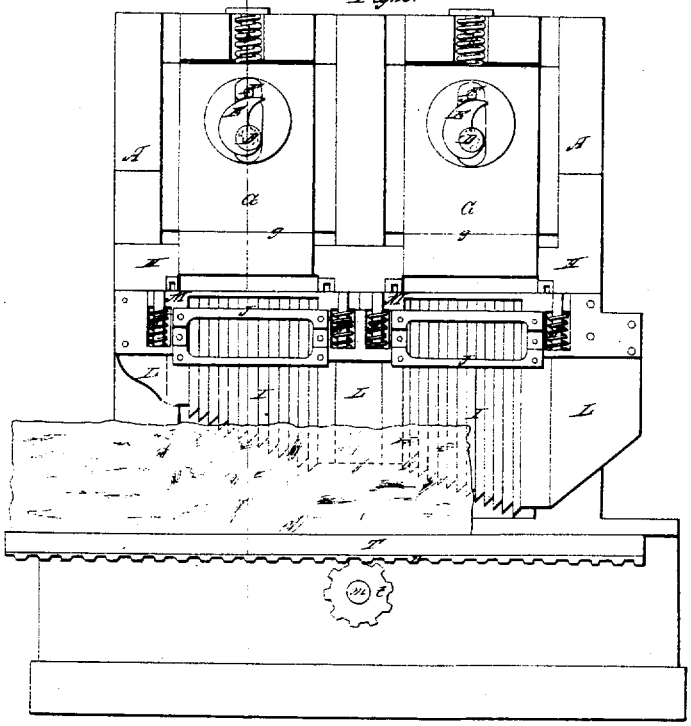
N. PETERS, PHOTO-LITHOGRAPHER, WASHINGTON, D. C.

BEST AVAILABLE COPY
G. M. Morgan.
Sheet 2, 2 Sheets.
Stone Dressing Mach.
No. 4,263.
Reissued Feb. 14, 1871
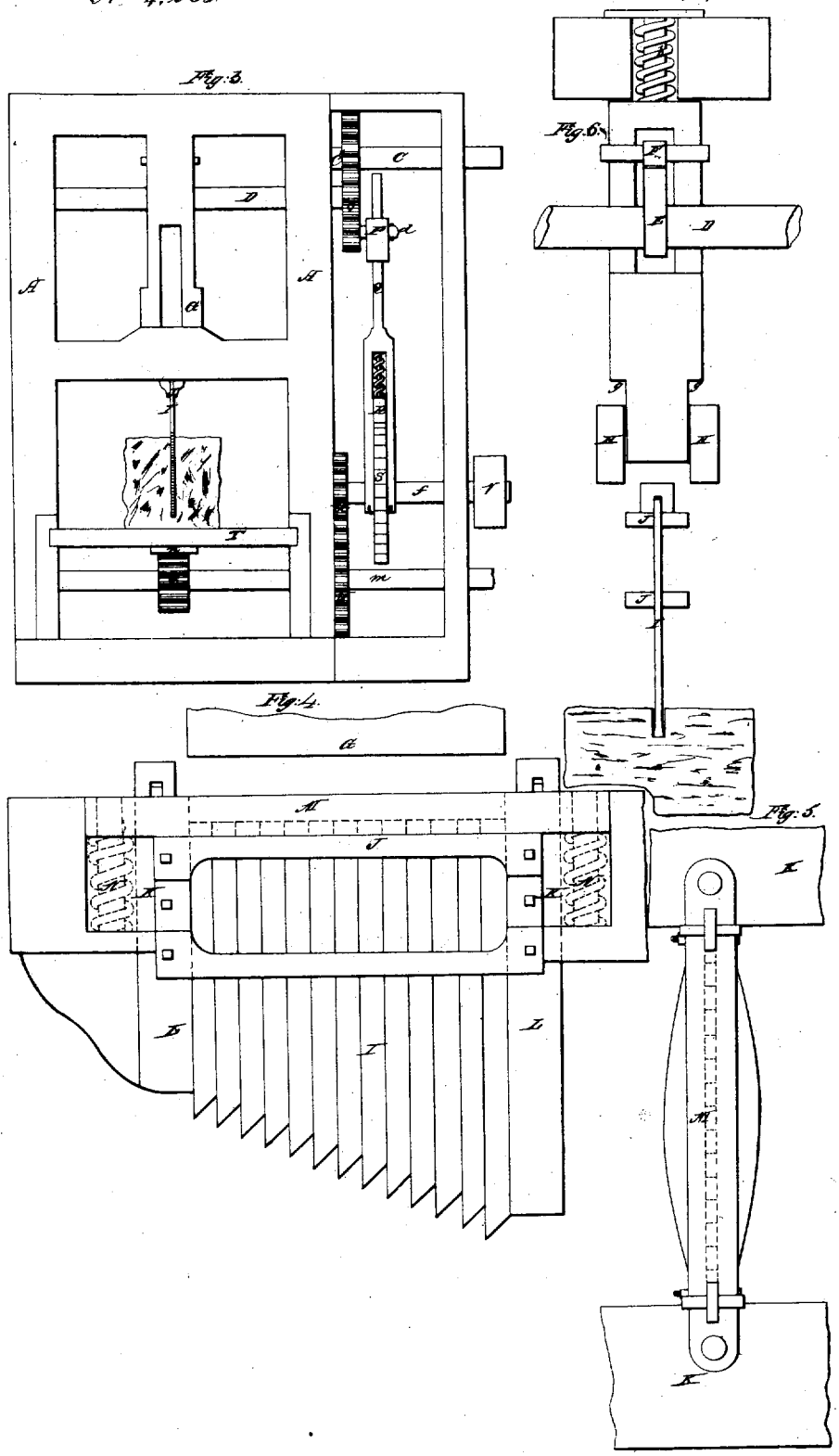
N. PETERS, PHOTO-LITHOGRAPHER, WASHINGTON, D. C.

United States Patent Office.

GEORGE MORGAN, OF BROOKLYN, NEW YORK.

Letters Patent No. 22,569, January 11, 1859; reissue No. 4,263, dated February 14, 1871.

IMPROVEMENT IN MACHINES FOR CUTTING STONE.

The Schedule referred to in these Letters Patent and making part of the same.

*To all whom it may concern:*

Be it known that I, GEORGE MORGAN, of the city of Brooklyn, in the county of Kings and State of New York, have invented a new and useful "Machine for Cutting Stone;" and I do hereby declare that the following is a full, clear, and exact description of the same, reference being had to the annexed drawing making a part of this specification, in which—

Figure 1 represents a perspective view of my machine.

Figure 2 is a longitudinal vertical section of the same.

Figure 3 is a front elevation of it.

Figure 4 is a longitudinal section of the cutter-frame on a larger scale.

Figure 5 is a plan or top view belonging to fig. 4.

Figure 6 is a transverse section of my machine, the line B B, fig. 2, indicating the plane of section.

Similar letters of reference indicate corresponding parts in the several figures.

My invention consists in arranging a gang of drills, cutters, or chisels of gradually-increasing lengths of the cutting-edges, in frames or clamps so that the cutting-edge of the combined series will have a serrated, inclined, and step-like form, and in giving to the said combined series of cutters a reciprocating up-and-down motion, so that each cutter will strike the stone at the same time, but at different altitudes.

To enable others skilled in the art to fully understand and construct my machine, I will proceed to describe it.

The stone to be operated may be placed upon a carriage. A frame, A, supports the carriage T, which slides in ways, *a*, and which forms the support for a block of stone which is to be operated upon by the cutter.

The cutters I are arranged in clamps or frames, J J, one behind the other, and so that the cutting-edge of each will project below that of the one next in advance of it, and the combined series of cutters will form a serrated, step-like cutting-edge, having an inclination of about thirty degrees (more or less) to the face of the stone operated upon.

The cutters may be operated so as to strike successive blows upon the stone by various well-known means; but in this case I have shown them operated by hammers and springs, as hereinafter described.

The frames J J work up and down in guides, K, which are supported by stays, L, and they are attached to cross-bars, M, which rest on spiral springs, N, so that after each blow the cutter-frames are raised up to their original position.

Above the cross-bars M, and guided by the frame A, are the hammers G, which are lifted and dropped by the action of trippers, E, which are attached to the shafts D, and which act on friction-rollers, F, which are attached to the hammers.

At the upper end of these hammers spiral springs, *b*, are arranged in such a manner that they are compressed when the hammers are raised, so as to increase the force of the blows.

At their lower ends these hammers are provided with shoulders, *g*, which act against cushions, H, fig. 6, so that any surplus force is intercepted.

Motion is conveyed to the shafts D from the driving-shaft C by means of gear-wheels, C* and O, and the feed motion of the carriage T is effected by means of a ratchet-wheel, S, which is operated upon by a pawl, R, which is connected to an arm, P, by a rod, Q, and the arm P is pivoted at one end to the frame A, while its other end is carried up and down by an eccentric wrist-pin, *d*, which is attached to one of the wheels O.

The ratchet-wheel S is attached to a shaft, *f*, which carries a cog-wheel, U, at one end, and a pulley, V, at the other.

The cog-wheel U gears into another cog-wheel, W, which is attached to a shaft, *m*, which extends under the carriage T, and a pinion, *t*, is fastened to this shaft, which gears into a rack, *n*, which is attached to and which extends under the carriage through its full length.

The operation is as follows:

The stone is placed on the carriage in such a position that the cutters are in line with that place through which a rip is intended to be made, and the machine is started.

As the stone is fed against the cutters by the action of the pawl R and the ratchet-wheel S, its end comes in contact with the shorter end of the serrated cutter, and at each successive blow of the hammer the bed advances so as to bring an additional tooth of the cutter in contact with the stone until the entire series or number of teeth of the cutter-blade is brought into operation, as represented in fig. 2 of the drawing, and each tooth takes off from the stone just as much as it projects beyond the next preceding tooth, and as the cutters are raised up after each blow by the action of the spring N, their cutting-edges are preserved, and they offer no obstruction to the feed motion.

By the time the full length of the stone has passed under the cutters an incision is made through the same, (see figs. 3 and 6,) just as deep as the longest one of the cutters permits; and if the cutters are long enough, the thickest block of stone may thus be severed.

By raising the pawl R the carriage is brought back to its original position by means of the pulley V, which is driven by a belt from a fast and loose pulley.

Having thus described my invention,

What I claim as new, and desire to secure by Letters Patent, is—

1. The arrangement, in the tool-stock of a stone-cutting machine, of a series of cutters fastened together and having their edges graduated one above the other, so that the combined series will present an inclined serrated cutting-edge, substantially as and for the purpose herein specified.

2. In combination with a series of cutters fastened together and having their edges graduated one above another, as described, a movable table to hold the stone to be cut and present it to the cutters, substantially as herein set forth.

Witnesses: GEORGE MORGAN.

WM. F. MCNAMARA,

ALEX. F. ROBERTS.